CALL-PROGRESS SIGNAL DETECTOR

Filed May 24, 1963 2 Sheets-Sheet 1

INVENTORS: P. J. GERMOND
J. C. LASWELL
D. T. SEWARD

BY J. P. Kearns
ATTORNEY

United States Patent Office 3,270,143
Patented August 30, 1966

3,270,143

CALL-PROGRESS SIGNAL DETECTOR

Paul J. Germond, Wall, Jesse C. Laswell, Neptune, and Douglas T. Seward, Union Beach, N.J., assignors to Bell Telephone Laboratories, Incorporated, New York, N.Y., a corporation of New York Filed May 24, 1963, Ser. No. 282,926
6 Claims. (Cl. 179—84)

This invention relates to signaling tone detectors for data transmission sets and, in particular, to circuits for detecting supervisory call progress tones generated in telephone central offices.

In the application of P. J. Germond and K. L. Mayer, Serial No. 242,765, filed December 6, 1962, an automatic telephone number dialing system capable of control by a business data machine is disclosed. In the automatic dialing system there disclosed dial digits of a called subscriber are furnished sequentially for automatic outpulsing directly by the connected business machine. Such an automatic dialing system becomes more valuable if it can detect and interpret all supervisory signals generated in the telephone central office, such as, busy and recorder signals. The automatic dialing system as previously described is capable only of recognizing a special tone signal generated by the called subscriber upon going off-hook and a direct-current dial go-ahead signal from the central office.

It is an object of this invention to detect the various supervisory tones generated in telephone central offices which indicate to the calling subscriber the status of the called subscriber's line. These so-called call-progress tones are usually recognized aurally by a human caller, who can then decide what further action to take. If the line is busy, he can try again later, or dial a second known line connecting to the same called subscriber. A business machine can be programmed to take appropriate alternative actions, as would a human caller, if it is apprised of the occurrence of these call-progress tones.

The call-progress tones are distinguished by their repetitive cyclical nature and by the duration of their on and off periods.

It is another object of this invention to distinguish among the several call-progress tones generated in telephone central offices by the duration of their cyclical tone-off intervals.

It is a further object of this invention to distinguish between call-progress tones, which are cyclical in nature, and other tones and noise on the telephone line, which are continuous.

It is still another object of this invention to indicate positively to a connected business machine what particular call-progress tone has been detected.

Call progress tone signals are well known in the telephone plant and comprise successive tone and no-tone intervals, cyclically repeated at 10, 20, 60 or 120 impulses per minute. The duration of the no-tone interval identifies the particular call-progress tone signal. For example, a two-second tone interval alternating with a four-second, no-tone interval at 10 impulses per minute indicates to the calling subscriber that a ringing signal is being delivered to the called subscriber. An interrupted one-second tone interval repeated every three seconds at 30 impulses per minute indicates an intercept or "no-such-number" signal. Similarly, a one-third second tone interval alternating with a two-third second no-tone interval at 60 impulses per minute indicates the called station is busy, and a still more rapid alternation between tone-on and tone-off intervals at 120 impulses per minute defines an "all-trunks-busy" or reorder signal.

It should be pointed out that call-progress tones for direct-distance-dialing (DDD) service are not held to close tolerances throughout the telephone plant. The tones, as a practical matter, vary from 400 to 700 cycles amplitude modulated at rates between 120 and 160 cycles per second. This situation compounds the problem of machine detection on the basis of frequency discrimination. Noise in the plant at this frequency band is often comparable in level to the signal, thereby making wide-band filtering difficult and unreliable. Therefore, in anticipation of wide scale use of data communication over the public telephone network, it is proposed to frequency-shift modulate twenty-cycle tone-on intervals at frequencies relatively high in the voice band. Frequency-shift frequencies of 2025 and 2225 cycles are being proposed. The 2025-cycle frequency occurs during positive half-cycles of the 20-cycle tone and the 2225-cycle frequency during the negative half-cycles. Subscriber data sets provided with an automatic answer feature are already being equipped to generate a steady tone at 2025 cycles as an off-hook signal.

It is therefore an additional object of this invention to distinguish between steady answering tone signals and frequency-shift call-progress tone signals, which include a common frequency.

According to this invention, all incoming signals during data call setup are initially amplified and limited. By narrow-band filter techniques all frequencies except the frequency chosen to be common to the automatic answering signal and the call-progress tones are rejected. A threshold detector operates responsive to the detection of the common tone to control the charging of a capacitor. Another threshold circuit operates responsive to the prolonged charging of the capacitor to actuate an answering signal relay. Repeated charging and discharging of the capacitor, however, primes a call-progress tone detector which responds to the end of the tone interval by activating a plurality of timing circuits arranged in a sequence of increasing time-out periods. Through logical gating circuits these timers control which of a group of signal relays corresponding to each call-progress tone having a given tone-off interval is readied for operation. A comparison of the length of the tone-off interval with the status of the shortest running timer at the end of such interval determines the signal relay which operates. As soon as any relay operates, the circuit locks up until the call is completed or abandoned.

A more complete understanding of this invention will be obtained from a consideration of the following detailed description and the drawing in which.

Figure 1:
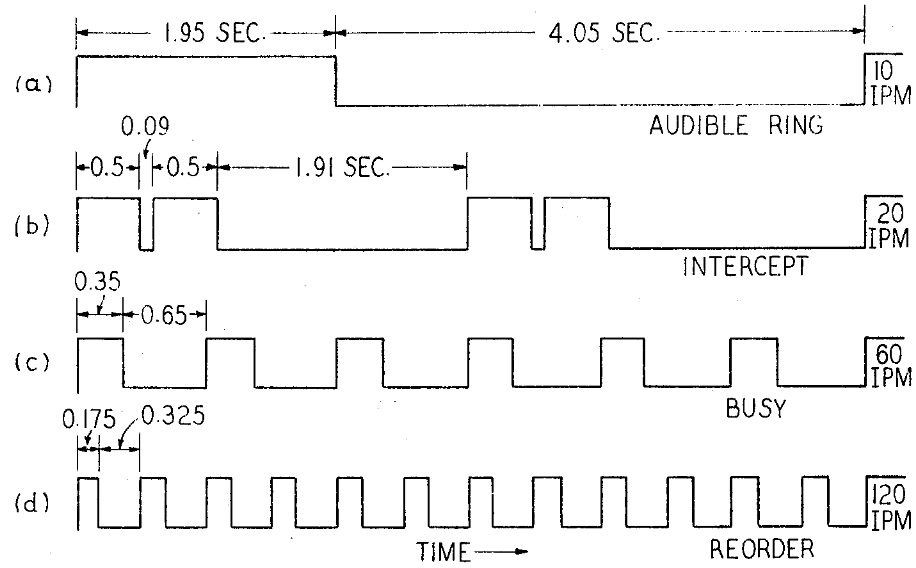
FIG. 1 is a waveform diagram of typical call-progress tones detectable by this invention.

The waveforms of the most common supervisory signals, as distinguished from control signals such as dial pulses, are shown in the several parts of FIG. 1. Each waveform is characterized by an on-period of one duration followed by an off-period of approximately twice the duration of the on-period. These signals are cyclically repeated until the called party goes off-hook or the calling party abandons the call. The on-period is the positive portion of the wave. During this period a 20-cycle tone is normally present which is a buzzing sound to the ear. During the off-period there is no sound. In order to facilitate machine detection of these signals it is planned to generate a frequency-shift signal during the on-interval at a 20-cycle rate in certain central offices to which data subscribers will be connected. Eventually this could become a universal practice for all central offices. It is proposed that the shift frequencies will be 2025 and 2225 cycles per second. These frequencies are chosen within the voice-frequency band to avoid conflict with the so-called single-frequency signaling tones at 2400 and 2600 cycles per second. It has been further proposed that central offices being modified to accept push-button dial signals be equipped to transmit dial tone as a frequency-shift signal at 350 and 440 cycles per second.

FIG. 1(*a*) shows the waveform of the usual audible ring signal, approximately two seconds on and four seconds off, repeated at 10 impulses per minute. This signal tells the calling subscriber that the called subscriber is being rung. It ceases when the called subscriber goes off-hook.

FIG. 1(*b*) shows the waveform of the intercept or "no-such-number" signal, which indicates to the calling subscriber that he has reached an unassigned number. Often an intercept operator breaks in to give further assistance, such as the information that the number called has been changed to a new number not yet published in a directory. This signal is a double buzz occurring in about one second followed by about two seconds of no-tone, repeated at a rate of 20 impulses per minute.

FIG. 1(*c*) shows the waveform of the ordinary busy signal which is a rapid succession of short buzzes; the on-period is only about a third of a second followed by an off-period of about two-thirds of a second, repeated at a 60-impulse-per-minute rate. This signal indicates that the called subscriber is engaged on another call. It will be necessary to call again later.

FIG. 1(*d*) shows the waveform of the re-order or "all-trunks-busy" signal, which is similar to the ordinary busy signal, but at twice the repetition rate. This signal indicates that the central office is being besieged with more calls than it can handle simultaneously in a traffic overflow situation. It is necessary to abandon the call and try again later.

It has previously been indicated that the 2025-cycle frequency is also used as an answering or off-hook signal by data sets provided with an automatic answering feature. Since the same frequency alternating with a somewhat higher frequency defines the tone-on interval of each of the several call-progress signals, a detector for the latter signals can conveniently be combined with a detector for the former. The 2025-cycle tone is detected apart from any other tones appearing on the telephone line. The answering signal is then distinguished from the call-progress signals by its persistence for longer than about 200 milliseconds. This is an adequate margin because the 2025-cycle tone is present in a call-progress signal only in 25-millisecond bursts, assuming a 20-cycle modulation rate. Once the determination is made that a call-progress signal is present rather than an answering signal, the several call-progress signals can be distinguished by comparing the tone-off intervals with the outputs of preset electronic timers.

Figure 2:
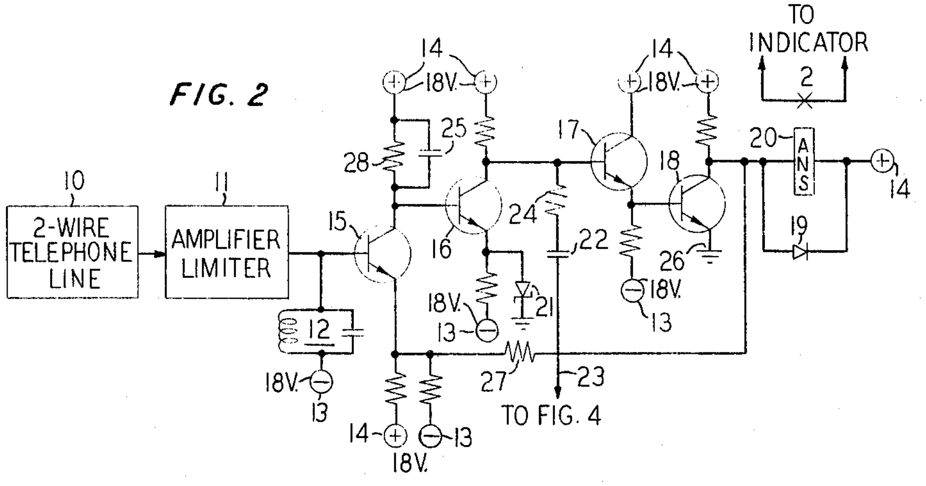
FIG. 2 is a circuit diagram of a representative embodiment of this invention capable of detecting a steady answering tone.
Figure 4:
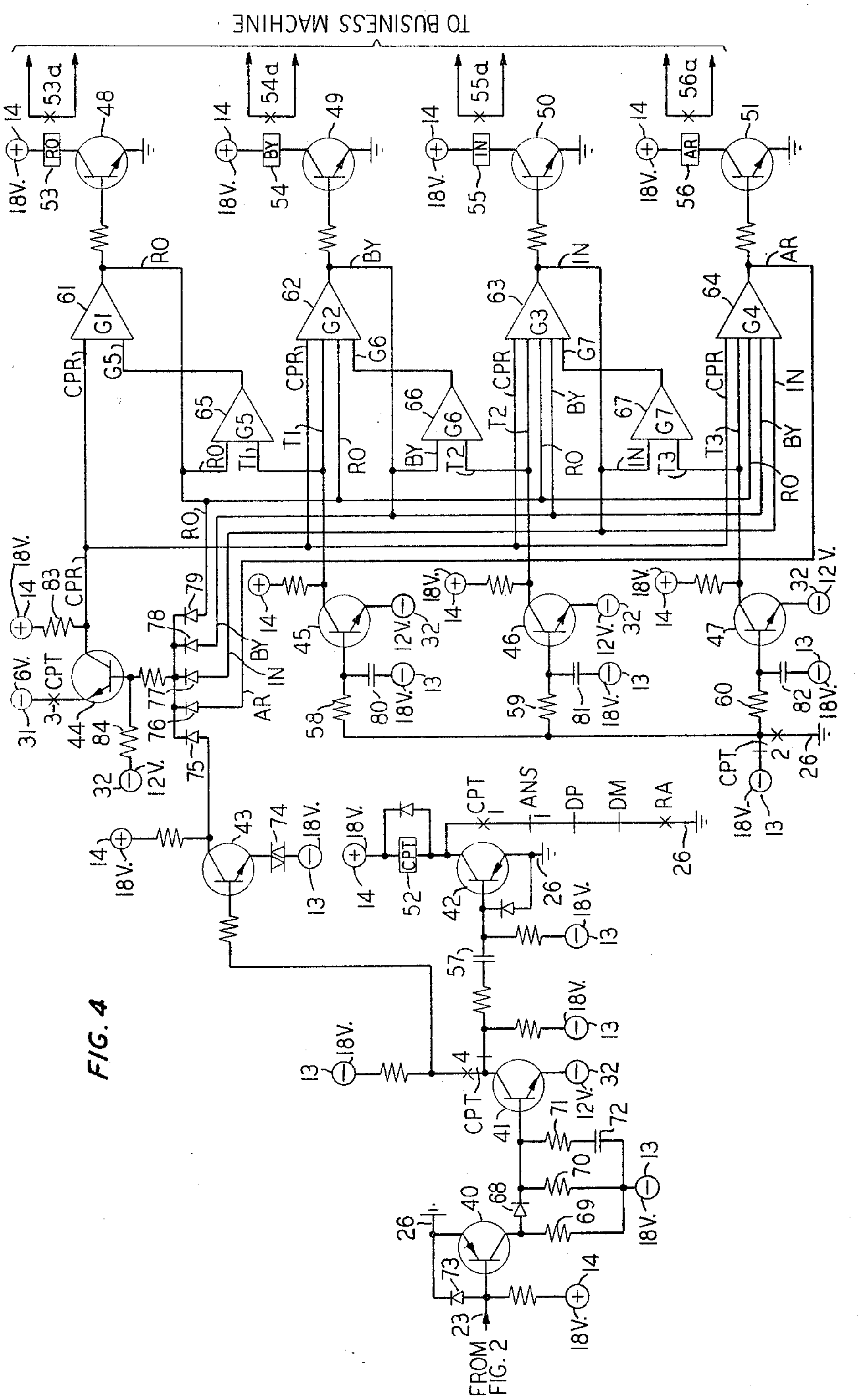
FIG. 4 is a representative embodiment of a circuit for discriminating between the several call-progress tones on the basis of the duration of their tone-off intervals. The circuits of FIGS. 2 and 4 co-act to distinguish between steady answering tone and pulsating call-progress tones.

An illustrative circuit for accomplishing these ends is shown in FIGS. 2 and 4. The circuit of FIG. 2 detects the presence of the 2025-cycle tone per se and actuates an answering relay if the tone persists for a minimum of 200 milliseconds, while the circuit of FIG. 4 times the off-interval of a call-progress signal and actuates an appropriate relay. The call-progress signal detection circuit of FIG. 4 performs four functions: initial detection of a call progress signal, detection of the beginning of the tone-off interval, detection of the return of the on-interval, and differentiation between the several signals.

In FIGS. 2 and 4 of the drawing relay contacts are shown in functional relationship to the circuits which they control and detached from the relay core by which they are operated. The contacts are identified by the designation assigned to the relay core on which they are physically located. Contacts which are closed when the associated relay is in its released condition, known as "break contacts," are represented by a single short stroke perpendicular to the conductor line. Contacts which are closed when the relay is in its operated condition, known as "make contacts," are represented by two short cross strokes diagonally intersecting the conductor line. There are several contacts appearing on FIG. 4 which are operated by relay cores located in the automatic dialing system disclosed in the above-mentioned P. J. Germond et al. application, to which reference is made for the details of operation of such contacts.

There are three levels of negative voltage used in the circuit and they are indicated by encircled minus signs and the designations 6, 12 and 18 volts. A positive voltage source (about 18 volts) is indicated by an encircled plus sign.

The initial tone detection circuit of FIG. 2 comprises an automatic-gain-controlled amplifier-limiter 11 connected to a conventional two-wire telephone subscriber line 10, a parallel-resonant narrow-band filter 12 tuned to the assumed 2025-cycle frequency, threshold detector transistor 15, gating transistor 16, timing capacitor 22, emitter-follower transistor 17, relay driver transistor 18 and answer relay 20. Two-wire telephone line 10 is a conventional calling subscriber's line connected to a telephone central office. Amplifier-limiter 11 in a conventional manner maintains a constant level input to tuned circuit 12 in square-wave form. Circuit 12 is sharply tuned to the 2025-cycle frequency and therefore effectively rejects all other frequencies including the 2225-cycle frequency used as a companion frequency-shift tone in the call-progress signals. Circuit 12 is connected to high negative voltage source 13 at one terminal and to the base electrode of junction transistor 15. The emitter of transistor 15 is returned to a slightly smaller negative bias than source 13 provided by a resistive voltage divider between positive and negative sources 14 and 13. The collector of transistor 15 at the same time is connected through a resistor and capacitor 25 in parallel to positive source 14. Therefore, transistor 15 is cut off in the absence of any build-up of voltage across tuned circuit 12. As soon as the 2025-cycle frequency is detected, a voltage builds up across tuned circuit 12 and the positive peaks turn transistor 15 on. Capacitor 25 charges rapidly through the transistor during these positive peaks, and the collector falls to the emitter potential. When the transistor is cut off during negative peaks, however, capacitor 25 can only discharge through its associated resistor 28. Thus, the collector remains negative for the duration of the 2025-cycle signal due to the integrating action of capacitor 25 and resistor 28, but goes positive for the no-signal conditions and in the presence of the 2225-cycle signal frequency.

Transistor 16 has its base electrode connected to the collector of transistor 15. Transistor 16 is normally in saturation when transistor 15 is cut off because of the small negative bias on its emitter electrode due to the presence thereat of Zener diode 21, which is fed from negative source 13 through the resistor shown. The collector of transistor 16 is returned to the positive voltage source 14 through a load resistor. However, when transistor 15 turns on transistor 16 turns off due to the resultant large negative potential on the collector of transistor 15.

Transistor 16 controls the charging and discharging of capacitor 22 through resistor 24 and its own collector load resistor. The lower terminal of capacitor 22 is connected to a positive voltage source (shown in FIG. 4) over lead 23. As long as transistor 16 is in saturation (no 2025-cycle signal present), the upper terminal of capacitor 22 is at approximately the negative potential of Zener diode 21. When the 2025-cycle signal frequency is detected and transistor 16 is cut off, capacitor 22 charges at a relatively slow rate toward the potential of positive voltage source 14.

Transistors 17 and 18 constitute a relay driver circuit. Transistor 17, with its collector returned directly to positive source 14 and having a large emitter load resistor connected to negative voltage source 13, acts as an emitter follower with a relatively high input impedance with little effect on the charge and discharge of capacitor 22. Its emitter assumes whatever potential appears at its base electrode, which in turn is connected to the collector of transistor 16. Transistor 18 has its emitter grounded, its base connected to the emitter of transistor 17, and its collector connected through a load resistor to positive voltage source 14. To the collector of transistor 18 is also connected one side of the operating winding of answer relay 20, the other side of which is connected to source 14. Diode 19 connected across relay 20 protects driver transistor 18 against transient voltages which occur during the switching of the highly inductive relay load.

Since the emitter of transistor 18 is grounded, it can only be turned on by a base bias above ground. Because of emitter follower 17 the base bias on transistor 18 is substantially the potential of the upper plate of capacitor 22. The time constant of the charging path for capacitor 22 is such that it requires about 200 milliseconds for the upper terminal to rise above ground level and turn transistor 18 on. It is apparent that the answer relay is operated by transistor 18 only when the 2025-cycle signaling tone persists longer than 200 milliseconds. It will not operate on call-progress signals because the 2025-cycle tone occurs in mere 25-millisecond bursts therein. Normally the prolonged answering tone is only received at the time the called subscriber goes off-hook and all call-progress signals are terminated. A positive feedback from the collector of transistor 18 through resistor 27 to the emitter of transistor 15 is effective to lower the detection threshold for the incoming signal by making the emitter slightly more negative and thereby preventing relay chattering.

Figure 3:
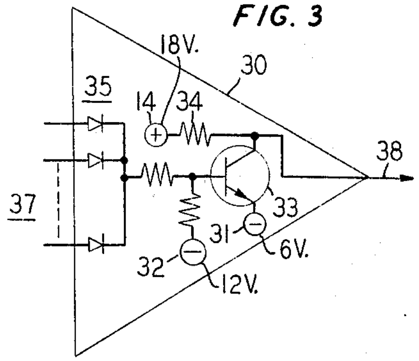
FIG. 3 is a typical embodiment of a NOR gating circuit useful in the practice of this invention.

FIG. 3 is a circuit diagram of a NOR (not-or) logical gating circuit useful in the practice of this invention. The circuit within the triangle 30, which symbol is used later to indicate such a gating circuit, comprises an n-p-n transistor 33 with the usual base, emitter and collector electrodes, biasing arrangements for the transistor which normally maintain it in the cut-off condition, and a plurality of input diodes 35 for maintaining isolation among the several inputs. Positive voltage source 14 is connected through load resistor 34 to the collector electrode of transistor 33 and output lead 38. The emitter electrode is biased by a somewhat negative voltage source 31; and the base electrode, by a more negative source 32 through a resistor. Since bias source 32 is more negative than bias source 31, the transistor is normally cut off and the potential on the output lead is positive. A plurality of input points 37 are connected through individual diodes 35 to the base electrode of the transistor through an isolating resistor as shown. A positive input on any input lead 37 forwardly biases the associated diode 35 and turns on transistor 33. The collector of the transistor, and hence output lead 38, then assume the negative potential of the emitter electrode. When, however, all input leads are at a negative potential, all diodes 35 are blocked and transistor 33 assumes its normal cut-off state, whereby a positive potential appears on output lead 38. This negative-or or NOR gate is used extensively in the logic circuitry of FIG. 4 with different numbers of input leads.

FIG. 4 is a schematic diagram of a call-progress signal detector according to this invention. The detector first determines that the on-interval of a call-progress signal is present and then prepares itself to time the off-interval. Finally, it recognizes the return of the on-interval, operates and locks one of the indicator relays according to the measured length of the off-interval, and resets itself when the message transmission begins.

The input to the circuit of FIG. 4 is taken from lead 23 coming from FIG. 2, which is in the charging path of capacitor 22. The base electrode of p-n-p transistor 40, of opposite conductivity type to the other transistors so far described in the circuits of FIGS. 2 and 3, is connected to lead 23. Transistor 40 is normally in the cut-off condition because the emitter is grounded at point 26 and diode 73 ties the base electrode to ground for all positive-going inputs. The collector circuit is returned to high negative voltage source 13 through a timing network including resistors 69, 70 and 71, diode 68 and capacitor 72. This timing circuit controls p-n-p transistor 41, to the base electrode of which it is connected. Transistor 41 is normally in saturation because its emitter electrode is biased less negatively by intermentiate potential source 32 than its base electrode, which is returned to high negative source 13.

When the 2025-cycle tone is detected by the circuit of FIG. 2, capacitor 22 charges in the positive direction. This has no effect on transistor 40 because of diode 73. However, when the incoming frequency shifts to 2225 cycles, capacitor 22 discharges rapidly in the negative direction and turns transistor 40 on momentarily. Its collector reaches ground potential and forward biases diode 68, permitting capacitor 72 to charge rapidly toward ground potential, thereby turning transistor 41 off. When transistor 40 goes off, capacitor 72 discharges slowly through resistors 70 and 71. The time constant is established to bridge the duration of at least a single cycle of the frequency-shift call-progress signal on-interval, that is, longer than 50 milliseconds. In this way transistor 41 is held off for the duration of the on-interval of the call-progress signal in spite of the frequency-shift occurring within this interval by the integrating action of the circuit including capacitor 72.

The collector electrode of transistor 41 is connected by way of the transfer contacts (CPT–4) of relay 52 (CPT) to either transistors 42 or 43. Initially relay 52 is released and therefore the collector of transistor 41 is connected through capacitor 57 to the base of transistor 42, in the collector load of which is relay 52. The emitter of transistor 42 is grounded at point 26 and is tied to the base by a diode poled toward the base. Therefore, the negative-going impulse on the collector of transistor 41 at the beginning of the initial tone-on interval does not affect transistor 42. However, at the end of the tone-on interval when transistor 41 goes on again, the resultant positive-going impulse is transmitted through capacitor 57 to the base of transistor 42, which then turns on. Relay 52 immediately operates and locks to ground through its own front contact CPT–1 in series with break contacts ANS–1, DP, DM and the make contact RA. The ANS–1 contact is on answer relay 20 in FIG. 2 and serves to disable the call-progress signal detector when the called subscriber goes off-hook. The digit-present DP, data-mode DM and request-for-automatic-dialing RA relays are located in other parts of a complete automatic dialing unit as described in the earlier cited Germond et al. application. All these contacts insure that the call-progress signal detector is operable only while a call is being set up, and not during dialing or message intervals.

Contact CPT–2 of relay 52 removes negative source 13 from, and applies ground to, the timing circuits associated with transistors 45, 46 and 47, described below. Contact CPT–4 transfers the collector of transistor 41 to the base of transistor 43, which is therefore armed to await the return of the call-progress on-interval.

Transistors 45, 46 and 47 form part of a circuit for measuring the tone-off interval of a call-progress signal. These transistors are normally cut off by reason of their base electrodes being returned to the more negative potential source 13 than their emitter electrodes, which are returned to intermediate source 32, when relay 52 is released. The respective base circuits include RC networks 58–80, 59–81 and 60–82, which have increasing time constants somewhat smaller than the off-intervals of the busy, intercept and audible ring call-progress signals. Therefore, transistors 45, 46 and 47 are turned on at measured intervals after relay 52 is operated. As each timer runs out, the collector electrode of the corresponding transistor goes negative.

The collectors of transistors 45, 46 and 47 are connected, respectively, on leads T1, T2 and T3 to inputs of gates 62, 63 and 64 of the type shown in FIG. 3. Gates 62, 63 and 64 form part of a logic circuit also including gates 61, 65, 66 and 67. The gates are also designated by corresponding G-numbers to make them easier to refer to. Each of gates G1, G2, G3 and G4 controls a relay driver transistor 48, 49, 50 and 51, respectively. The latter transistors in turn control relays 53, 54, 55 and 56 further designated RO (reorder), BY (busy, IN (intercept) and AR (audible ringing). The relays have corresponding make-contacts 53*a*, 54*a*, 55*a* and 56*a* which close circuits in a connected business machine to indicate what call-progress signal has been detected. Transistors 48 through 51 are normally cut-off because the outputs of the connected gates G1 through G4 are negative until all inputs are negative.

All gates G1 through G4 are held negative until a negative voltage appears on the CPR lead at the end of the call-progress signal off-interval. Gates G2 through G4 receive output signals from timer transistors 45 through 47, respectively. Each of these outputs goes negative successively as each timer times out. The outputs of each of gates G1 through G4 (leads RO, BY, IN, and AR) are brought to inputs of each higher numbered gate below it to prevent a gate with a longer running timer from being operated.

A group of auxiliary gates 65 through 67 (also designated G5 through G7) has outputs connected to inputs of gates G1 through G3, respectively. These gates normally have negative outputs. However, their inputs are provided by the timer outputs and the next higher RO, BY or IN output. Therefore, as each timer runs out, the corresponding G5, G6 or G7 gate goes positive and blocks the next higher G1, G2 or G3 gate. The combined effect of the auxiliary gates and the outputs of the higher gates G1 through G3 is that only that indicating relay can be operated which corresponds to the call-progress signal whose off-interval is shorter than the shortest running timer interval. That is to say, the relay associated with the timer which hs just run out is primed to operate when the CPR lead goes negative at the end of the call-progress tone-off interval. If no timer has run out, then the RO relay operates. If all timers have run out, the AR relay operates.

At the beginning of the tone-off interval the collector of transistor 41 was connected to the base of transistor 43 through a buffer resistor. Transistor 41 is in saturation during the tone-off interval and thus transistor 43 is also on because its base is at a higher potential than its emitter. Varistor 74 acts as a voltage regulator in the emitter circuit to establish a threshold level. The collector of transistor 43 is therefore negative.

Transistor 44 forms part of another NOR-gate, having a plurality of diodes 75 through 79 connected in common to its base electrode, which is biased negatively through resistor 84 to source 32. If the input to any of the diodes goes positive, transistor 44 turns on. Its emitter is connected to a small negative voltage source 31 through contact CPT–3 of relay 52. Its collector, connected to positive voltage source 14 through load resistor 83, determines the potential on the CPR lead, which connects to gates G1 through G4. Diode 75 is connected to the collector of transistor 43. The remaining diodes are connected to the respective outputs of gates G1 through G4, as shown.

As soon as the call-progress signal reaches its next on-interval, capacitor 22 (FIG. 2) charges momentarily at the first transition from 2025 to 2225 cycles and turns transistor 40 on long enough to allow the charge on capacitor 72 to rise to ground and cut-off transistor 41. Its collector potential falls and cuts off transistor 43 in turn. The collector potential of transistor 43 thereupon goes positive and gates transistor 44 on through diode 75. The CPR lead goes negative and allows one of gates G1 through G4 to go positive and operate an indicating relay. Also one of the other diodes 76 through 79 becomes forward biased and transistor 44 is held in saturation until CPT relay 52 releases at the end of the call set-up time indicating either completion or abandonment of the call.

As an example of the discrimination capabilities of this circuit, assume the call-progress signal detected is reorder RO. When the CPR lead goes negative, no timer has run out, because the RO signal has the shortest off-interval (FIG. 1). The positive output of transistor 45 holds the output of gates G2 and G5 negative. Both inputs to gate G1 are negative and its output is therefore positive to turn transistor 48 on and operate RO relay 53. The positive outputs of the other two timers hold gates G3 and G4 negative. The RO output of gate GI now holds transistor 44 in saturation; the inputs to gate G1 through gate G4, negative; and the outputs of gates G2 through G4, negative. The RO relay gives a continuous indication, and no other relay can be operated, even when their connected timers later run out.

Similarly, if the intercept signal had been detected, transistors 45 and 46 would have turned on. Only the timer associated with transistor 47 would still be running. Gate G5 would have gone positive to block gate G1, and likewise gate G6 would block gate G2. Gates G4 and G7 would be held negative by the running timer. Therefore, only gate G3 would be primed to go positive when the CPR lead becomes negative.

A standard dial tone signal is being implemented in central offices which will accept push-button multi-frequency tone dialing signals. Data customers will be connected to such offices in the future. This dial tone is a frequency-shift combination of 350 and 440 cycles. The circuit of FIG. 2 can be adapted to detect such a dial tone signal by substituting a filter tuned to one of these frequencies for circuit 12. This can be done automatically by using a transfer relay which places the low-frequency filter in the circuit when the caller goes off-hook to originate a call and substitutes the high-frequency filter when dialing commences. Indicating contacts can be placed on the answering relay to satisfy either requirement.

The circuit of FIG. 4 can be adapted to detect similar cyclical signals characterized by differences in the tone-off intervals by installing additional timing circuits with appropriate time-out intervals in accordance with the principles of this invention.

Although a specific embodiment of this invention has been shown and described, it will be understood that various modifications can be made without departing from the spirit of this invention and within the scope of the appended claims.

What is claimed is:

1. In a circuit for detecting telephone call-progress signals which can be either a steady tone of a first frequency or a tone interval of alternating pulses of the first frequency and a second frequency and a no-tone interval longer than a cycle in the alternating tone interval, the combination of a tuned detector responsive to said first frequency, first means driven by said tuned detector generating an output signal responsive to the steady persistence of said first frequency for a predetermined minimum time interval, second means driven by said tuned detector responsive first to the end of an initial alternating tone interval and then to the beginning of a second alternating tone interval thereby furnishing output signals corresponding to the beginning and end of a no-tone interval, and timing means responsive to the respective output signals from said second means producing discrete outputs according to the length of a given tone-off interval.

2. The circuit of claim 1 in which said first means comprises means connected to said tuned detector producing a a rectified output corresponding to the presence of said first frequency, a capacitor charged by said rectified output, a relay having a contact which is closed to indicate the presence of a steady signal at said first frequency, a monostable circuit having an operating threshold driving said relay, and means connecting said capacitor to said monostable circuit, staid capacitor acquiring sufficient charge from said rectified output to exceed the operating threshold of said monostable circuit in said predetermined minimum time interval.

3. The circuit of claim 1 in which said second means comprises switching means closing momentarily at the cessation of said first frequency, a capacitor controlled by said switching means for receiving a rapid charge upon the closing of said switching means and having a slow discharge path, a threshold circuit responsive to the charging and discharging of said capacitor, a transfer relay operable by said threshold circuit, a plurality of timing circuits each running out in times comparable to the duration of the no-tone intervals in said call-progress signals, contact means on said transfer relay for actuating said timing circuits, a plurality of indicator relays all but one controlled by individual ones of said timers, logical gating means connecting said timers to said indicator relays, and means connected to said gating means responsive to the return of said first frequency at the end of a no-tone interval causing the operation of that one of said indicator relays connected to the timer just having timed out or said one relay if no timer has timed out.

4. In a circuit for detecting a telephone call-progress signal which includes a tone interval of alternate bursts of first and second frequencies and a no-tone interval whose duration is characteristic of a given signal, a detector responsive to the transitions between said first and second frequencies in a tone interval, a first switching circuit connected to said detector and holding itself closed responsive to an output therefrom during said tone intervals, a transfer relay connected to said first switching circuit and operated upon the opening thereof, a second switching circuit, a contact on said transfer relay connecting said first switching circuit to said second switching circuit upon the first operation thereof, said second switching circuit closing on the next operation of said contact at the end of said no-tone interval and producing a control output, a plurality of call-progress indicator relays, a plurality of timing circuits controlling all but one of said indicator relays, said timing circuits running out at discrete intervals corresponding to the duration of the no-tone intervals of particular call-progress signals and blocking the operation of the indicator relays representing call-progress signals having no-tone intervals shorter than its run-out interval, and a plurality of gating circuits connected between said timing circuits and said indicator relays jointly responsive to said control output and the state of said timing circuits to operate one and only one of said indicator relays on the occurrence of said control signal.

5. In a circuit for detecting call-progress signals which include tone intervals of alternate pulses alternating with no-tone intervals, the length of said no-tone intervals being distinctive of signals of a particular significance, a detector operated at the end of an interval of said alternate pulses and released at the beginning of a succeeding such interval, a plurality of timers generating outputs at intervals proportional to the duration of said distinctive no-tone intervals, means starting said timers in unison responsive to the operation of said detector, a plurality of call-progress signal indicator means, a plurality of gating circuits driving said indicator means, means connecting the outputs of said timers to individual ones of said gating means, means operated by each of said gating means for inhibiting all other gating means connected to timers having longer timed intervals than its connected timer, and means enabling all said gating means responsive to the release of said detector means, that one of said gates thereby opening whose connected timer has just timed out.

6. In combination, a telephone line over which are transmitted supervisory call-progress signals including alternate tone-on and tone-off intervals, said tone-on intervals consisting of alternate bursts of a first and second frequency in the voice-frequency band and said tone-off intervals have discrete durations characterizing particular call-progress signals and also a continuous answering signal at said first frequency, and means connected to said line discriminating among the steady answering signal and all of the call-progress signals comprising a tuned detector assuming an on-state in the presence of said first frequency and an off-state otherwise, a capacitor driven by said detector and charging slowly during the on-state of said detector, an indicating device for said answering signal, a threshold circuit connected between said capacitor and said indicating device operating said device when the charge on said capacitor exceeds a predetermined threshold level, a trigger circuit having an input in series with said capacitor and responsive only to the discharge of said capacitor at the cessation of said first frequency, an integrating circuit connected to said trigger circuit having an output when repeatedly triggered, transfer means controlled by the output of said integrating circuit operating on the termination thereof and indicating thereby the beginning of a tone-off interval, a plurality of timing circuits producing successive outputs at intervals slightly less than the tone-off intervals in the several call-progress signals arranged in order of increasing time-out periods, the operation of said transfer means starting the running of said timing circuits, individual signal indicators for each of said call-progress signals, an array of coincidence gates having two or more inputs and one output including one driving each of said indicating means from its output and inhibiting ones having their outputs connected to an input of each driving gate except that driving the longest no-tone interval signal indicator, connections from each timing circuit to an input of a driving gate and to the inhibiting gate controlling the driving gate for the signal indicator of the next shorter time interval, connections from the output of each driving gate except that for the longest no-tone signal to an input of all driving gates for longer no-tone signal indicators, and means connected to the input of all driving gates enabling the operation of that one of said signal indicators corresponding to the call-progress signal having the next shorter no-tone interval than the timing interval of the shortest running timing circuit, said enabling means being under the joint control of said transfer means and said integrating circuit upon an output recurring at said integrating circuit at the end of a no-tone interval.

No references cited.

KATHLEEN H. CLAFFY, *Primary Examiner.*

H. ZELLER, *Assistant Examiner.*